United States Patent
Chandrashekhara et al.

(10) Patent No.: US 12,417,208 B2
(45) Date of Patent: Sep. 16, 2025

(54) DIRECT IMAGE LOOKUP FOR DETERMINING QUICK DIFFERENTIAL FOR SNAPSHOTS AND LINKED TARGETS

(71) Applicant: Dell Products, L.P., Hopkinton, MA (US)

(72) Inventors: Sandeep Chandrashekhara, Shrewsbury, MA (US); Michael Ferrari, Douglas, MA (US); Gu Huang, Chelmsford, MA (US); Akshay Kumar Srivastava, Bangalore (IN); Kevin Tobin, Hopedale, MA (US)

(73) Assignee: Dell Products, L.P., Hopkinton, MA (US)

( * ) Notice: Subject to any disclaimer, the term of this patent is extended or adjusted under 35 U.S.C. 154(b) by 123 days.

(21) Appl. No.: 17/957,097

(22) Filed: Sep. 30, 2022

(65) Prior Publication Data

US 2024/0111714 A1    Apr. 4, 2024

(51) Int. Cl.
  *G06F 16/11*    (2019.01)
  *G06F 16/14*    (2019.01)

(52) U.S. Cl.
  CPC ........... *G06F 16/128* (2019.01); *G06F 16/14* (2019.01)

(58) Field of Classification Search
  CPC ................. G06F 16/128; G06F 16/14
  See application file for complete search history.

(56) References Cited

U.S. PATENT DOCUMENTS

| | | | |
|---|---|---|---|
| 10,496,487 B1 * | 12/2019 | Natanzon | G06F 11/1451 |
| 11,188,425 B1 | 11/2021 | Tobin et al. | |
| 11,340,795 B2 | 5/2022 | Wilson et al. | |
| 2020/0349087 A1 * | 11/2020 | Kucherov | G06F 3/0608 |
| 2021/0374095 A1 | 12/2021 | Wilson et al. | |
| 2022/0342816 A1 * | 10/2022 | Derzhavetz | G06F 3/0659 |

* cited by examiner

*Primary Examiner* — Khanh B Pham
*Assistant Examiner* — Samuel C Sharpless, III
(74) *Attorney, Agent, or Firm* — Anderson Gorecki LLP

(57) ABSTRACT

Direct Image Lookup (DIL) metadata is used to perform differential operation for snapshots and linked targets. Each snapshot contains metadata to store "images" to perform direct lookup of user data for any part of any snapshot in the system. Metadata pages of DIL image data represent sets of tracks of data. Metadata pages of subsequent snapshots for the same sets of tracks are compared, and where there are no changes to a given metadata page for a given set of tracks between subsequent snapshot copies, the differential process is not run on the tracks associated with the metadata page. If a given metadata page associated with a set of tracks has changed between subsequent snapshots, the differential process is used to identify which tracks in the subsequent snapshot contain different data than the corresponding tracks of the previous snapshot. Similar differential processing also is implemented for relinked target devices.

20 Claims, 5 Drawing Sheets

DIRECT IMAGE LOOKUP FOR DETERMINING QUICK DIFFERENTIAL FOR SNAPSHOTS AND LINKED TARGETS

FIELD

This disclosure relates to computing systems and related devices and methods, and, more particularly, to a method and apparatus for using direct image lookup metadata for determining quick differential for snapshots and linked targets.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

The process of finding differential between snapshots and or linked targets is slow and can be challenging. At scale, differential processing exhibits inconsistencies in performance and can impact copy throughput. Traditionally, a differential process was used to scan each track of an entire device to compare subsequent snapshots, regardless of which tracks were changed.

According to some embodiments, each snapshot contains metadata to store "images" to perform direct lookup of user data for any part of any snapshot in the system. Metadata pages of Direct Image Lookup (DIL) metadata represent sets of tracks of data, and identify the locations on backend storage resources where the tracks of data are stored. Metadata pages of subsequent snapshots for the same sets of tracks are compared, and where there are no changes to a given metadata page for a given set of tracks between subsequent snapshot copies, the differential process is not run on the tracks associated with the metadata page. If a given metadata page associated with a set of tracks has changed between subsequent snapshots, the differential process is used to identify which tracks in the subsequent snapshot contain different data than the corresponding tracks of the previous snapshot.

Similarly, it is possible for a set of snapshots of a given source volume to be sequentially linked to a given target device. When a first snapshot is linked to the target device, the DIL image of the snapshot is used to determine the location of the tracks of data that are then written to the target device. In connection with writing the tracks of data of the target device, a DIL image of the target device is created. Subsequently, if a second snapshot is linked to the target device, the metadata pages of the second snapshot image are compared with corresponding metadata pages created from the DIL image of the target device. Where there are no changes to the metadata page for a given set of tracks between the newly linked snapshot and metadata page of the tracks of data that were previously copied to the target device, the differential process is not run on the tracks associated with the metadata page. If a given metadata page for a set of tracks of the second snapshot image does not match a corresponding metadata page created from the DIL image of the target device, the differential process is used to identify which tracks in the subsequent snapshot contain different data than the corresponding tracks of the target device. Differences between the metadata page of a second snapshot image and the corresponding metadata page of the target device image may be due to a write on a track on the source volume, which causes the metadata page of the second snapshot image to change relative to the first snapshot image, due to a write on the target device, which causes the metadata page of the target device image to change, or due to both a write on the source volume and a write on the target device.

By using metadata pages to determine which portions of a subsequent snapshot image has changed relative to a previous snapshot image, and to identify subsets of tracks of an iteratively linked target device that have changed in connection with linking the target to subsequent snapshots, it is possible to simplify and help scale and improve the performance of differential operation of targetless snapshots and their linked targets.

According to some embodiments, each snapshot contains metadata to store "images" to perform direct lookup of user data for any part of any snapshot in the system. Snapshots and images share the same metadata pages if there are no writes to ranges of tracks representing the metadata page between two snapshot activations and/or target relinks. A Differential process treats all tracks as the same for snapshot images and/or target relinks if they share a common metadata page, and it will skip all tracks that belong to the metadata page if the metadata page has not changed. In instances where the metadata page for a given set of tracks has changed relative to an earlier version (snapshot image or target relink), the differential process will compare each track entry associated with the metadata page to determine the differential. Using these metadata pages enables the amount of computational resources used by differential process to be reduced to be proportional to the rate of change of data, rather than being proportional to the size of the storage volumes, thus greatly reducing the overhead associated with implementing differential processing by the storage system in connection with creation of snapshot of a source volume and in connection with iteratively linking subsequent snapshots to a given target device.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
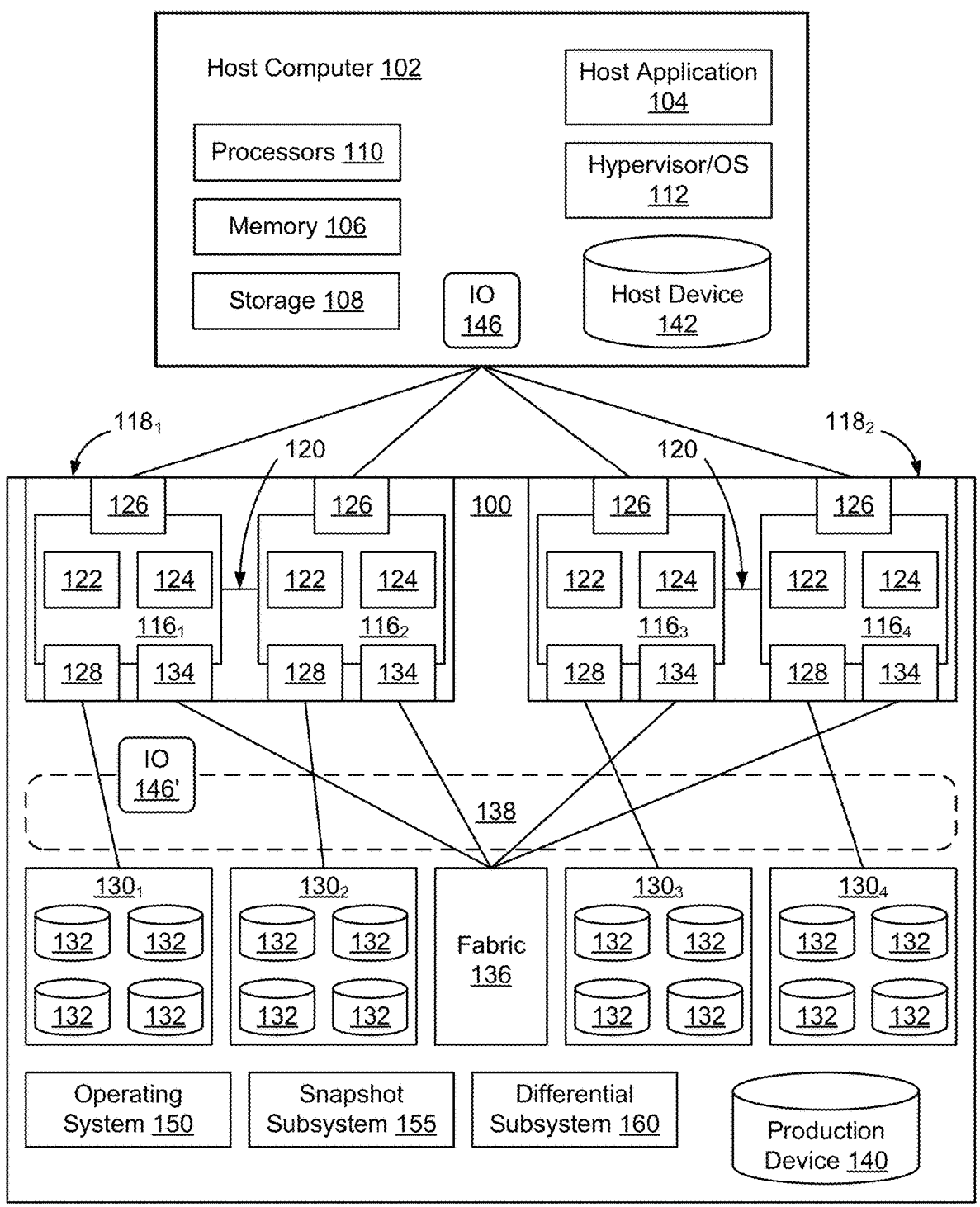
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g., including multiple CPUs, GPUs, and combinations thereof. The local volatile memory 124 may include, for example and without limitation, any type of RAM. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g., via DMA (Direct Memory Access) or RDMA (Remote Direct Memory Access). Shared global memory 138 will also be referred to herein as the cache of the storage system 100.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared global memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

In the case where IO 146 is a read command, the storage system 100 uses metadata to locate the commanded data, e.g., in the virtual shared global memory 138 or on managed drives 132. If the commanded data is not in the virtual shared global memory 138, then the data is temporarily copied into the virtual shared global memory 138 from the managed drives 132 and sent to the host application 104 by the front-end adapter 126 of one of the compute nodes $116_1$-$116_4$. In the case where the IO 146 is a write command, in some embodiments the storage system 100 copies a block being written into the virtual shared global memory 138, marks the data as dirty, and creates new metadata that maps the address of the data on the production device 140 to a location to which the block is written on the managed drives 132.

In some embodiments, the storage system includes a snapshot subsystem 155 configured to create point-in-time copies of volumes of data maintained by the storage system. The snapshot subsystem 155 is configured to perform data replication for a variety of reasons, such as enabling a storage object to be restored to an earlier point in time. A snapshot, as that term is used herein, refers to a copy of a storage object as the storage object existed at some prior point in time. A particular snapshot may be linked to a target device to enable the content of the snapshot to be made available to an application, such as to host application 104. In some instances, such as for software development, testing, and quality assurance, it is advantageous to cause multiple subsequent snapshots of a given storage volume to be iteratively linked to a given target device.

Whenever a snapshot is created, a differential subsystem 160 is used to find the differences between the current version of the storage volume and the previous version of the storage volume or a previous snapshot of the storage volume. The process implemented by differential subsystem 160 of finding the differential between snapshots and or linked targets is slow and can be challenging. At scale, differential processing exhibits inconsistencies in performance and can impact copy throughput. Traditionally, a differential process was used to scan each track of an entire device to compare subsequent snapshots, regardless of which tracks were changed. This enables the snapshot volume to ultimately only include the portions of the production volume that were changed since the previous snapshot was created. However, since the differential subsystem would need to compare the current version of each track of the production volume with the previous version of each track of the production volume, the amount of processing implemented by the differential subsystem increased proportionally with the size of the production volume. In instances where snapshots are being created frequently, this differential processing can affect overall performance of the storage system.

According to some embodiments, each snapshot contains metadata to store "images" to perform direct lookup of user data for any part of any snapshot in the system. Metadata pages of Direct Image Lookup (DIL) metadata represent sets of tracks of data, and identify the locations on backend storage resources where the tracks of data are stored. Metadata pages of subsequent snapshots for the same sets of tracks are compared, and where there are no changes to a given metadata page for a given set of tracks between subsequent snapshot copies, the differential process is not run on the tracks associated with the metadata page. If a given metadata page associated with a set of tracks has changed between subsequent snapshots, the differential process is used to identify which tracks in the subsequent snapshot contain different data than the corresponding tracks of the previous snapshot.

Similarly, it is possible for a set of snapshots of a given source volume to be sequentially linked to a given target device. When a first snapshot is linked to the target device, the DIL image of the snapshot is used to determine the location of the tracks of data that are then written to the target device. In connection with writing the tracks of data of the target device, a DIL image of the target device is created. Subsequently, if a second snapshot is linked to the target device, the metadata pages of the second snapshot image are compared with corresponding metadata pages created from the DIL image of the target device. Where there are no changes to the metadata page for a given set of tracks between the newly linked snapshot and metadata page of the tracks of data that were previously copied to the target device, the differential process is not run on the tracks associated with the metadata page. If a given metadata page for a set of tracks of the second snapshot image does not match a corresponding metadata page created from the DIL image of the target device, the differential process is used to identify which tracks in the subsequent snapshot contain different data than the corresponding tracks of the target device. Differences between the metadata page of a second snapshot image and the corresponding metadata page of the target device image may be due to a write on a track on the source volume, which causes the metadata page of the second snapshot image to change relative to the first snapshot image, due to a write on the target device, which causes the metadata page of the target device image to change, or due to both a write on the source volume and a write on the target device.

By using metadata pages to determine which portions of a subsequent snapshot image has changed relative to a previous snapshot image, and to identify subsets of tracks of an iteratively linked target device that have changed in connection with linking the target to subsequent snapshots, it is possible to simplify and help scale and improve the performance of differential operation of targetless snapshots and their linked targets.

According to some embodiments, each snapshot contains metadata to store "images" to perform direct lookup of user data for any part of any snapshot in the system. Snapshots and images share the same metadata pages if there are no writes to ranges of tracks representing the metadata page between two snapshot activations and/or target relinks. Differential operation treats all tracks as the same for snapshot images and/or target if they share a common metadata page, and it will skip all tracks that belong to the metadata page if the metadata page has not changed. In instances where the metadata page for a given set of tracks has changed relative to an earlier version (snapshot image or target relink), the differential process will compare each track entry associated with the metadata page to determine the differential. Using these metadata pages enables the differential process to be reduced to be proportional to the rate of change of data, rather than being proportional to the size of the storage volumes, thus greatly reducing the overhead associated with implementing differential processing by the storage system in connection with creation of snapshot of a source volume and in connection with iteratively linking subsequent snapshots to a given target device.

Figure 2:
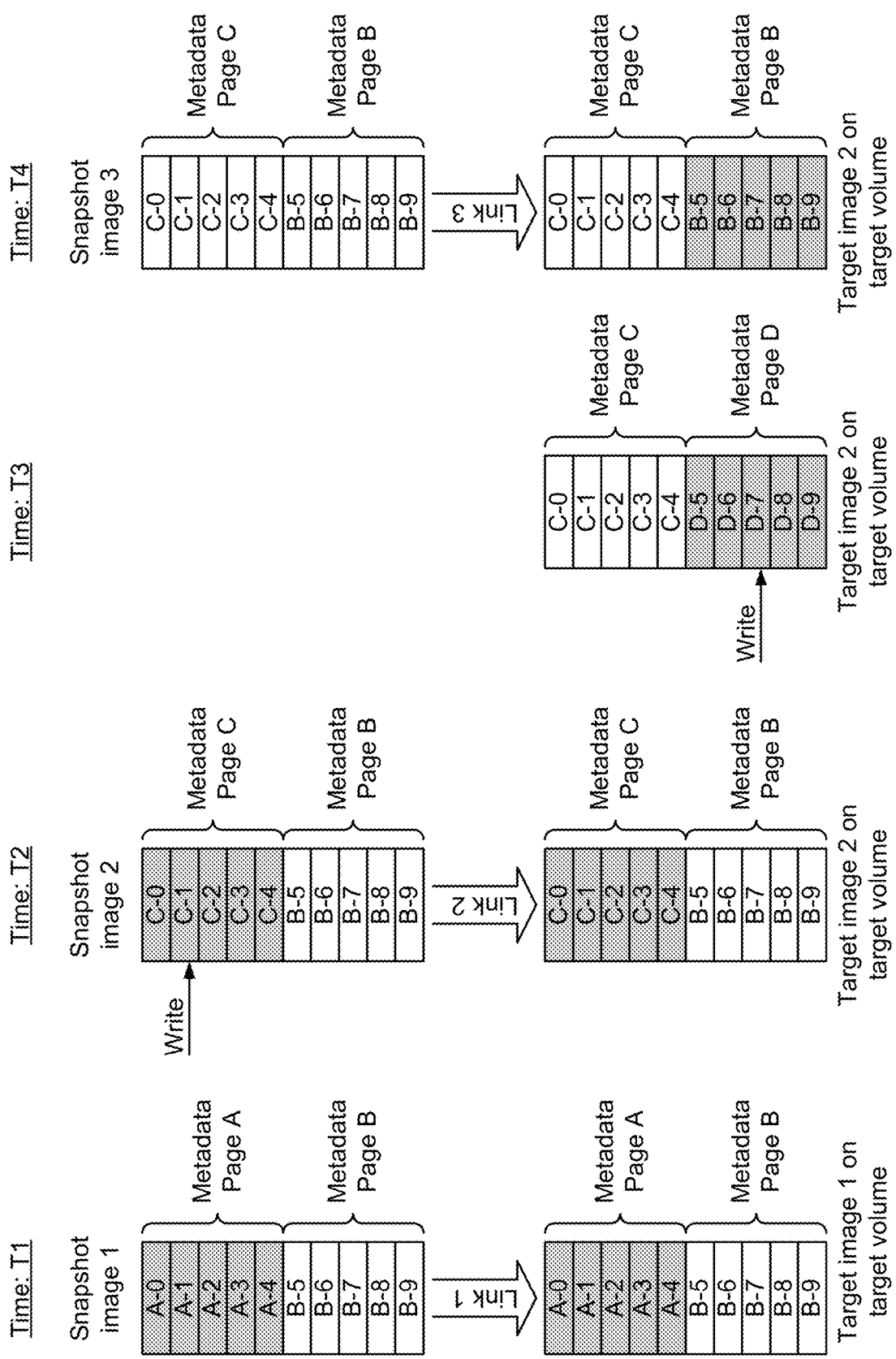
FIG. 2 is a functional block diagram illustrating examples of how Direct Image Lookup (DIL) image metadata can be used to implement quick differential determination between subsequent snapshot images and re-linked target device, according to some embodiments.

FIG. 2 is a functional block diagram illustrating examples of how Direct Image Lookup (DIL) image metadata can be used to implement quick differential determination between subsequent snapshot images and in connection with a re-linked target device, according to some embodiments. As shown in FIG. 2, in some embodiments when each snapshot is created, the snapshot contains metadata to store a "DIL image" that is used by the storage system to perform direct lookup of user data for any part of any snapshot in the system. A DIL (Data/direct Image Lookup) is a local replication concept that allows the I/O path to quickly find the data contents of a given track. Example DIL data is described in greater detail in U.S. Pat. No. 11,340,795, and in U.S. Pat. No. 11,188,425, the content of each of which is hereby incorporated herein by reference.

As shown in FIG. 2, subsequent snapshot "images" will share the same metadata page if there are no writes to range of tracks representing the metadata page between two snapshot activations. Similarly, if snapshots of the same production volume are subsequently linked to the same target device, subsequent target "images" will share the same metadata page if there are no writes to ranges of tracks between two target relink operations.

In FIG. 2, metadata page B is shared by snapshot images 1, 2, and 3, and target image 1. The same target device is linked 3 times using snapshot image 1, 2 and 3.

According to some embodiments, a differential process of differential subsystem 160 runs in the background and divides the work into multiple chunks based on the size of the volume. Multiple chunks are processed in parallel by multiple threads. The differential process 160 treats all tracks as the same for snapshot images and/or target relinks if they share common metadata page, and it will skip all tracks belong to the metadata page if the metadata page hasn't changed. In FIG. 2, snapshot #2 and snapshot #3 share metadata pages C and B. Accordingly, the differential process 160 will skip all tracks associated with metadata pages C and B without going through each track entry, and reports the differential as unchanged.

In instances where a given metadata page for a set of tracks is different between snapshot images, the differential process 160 is configured to compare each track entry in the metadata page to determine the differential. In FIG. 2, snapshot DIL image #1 includes metadata page A for the first set of tracks 0-4, and snapshot DIL image #2 includes metadata page C for the first set of tracks 0-4. Specifically, as shown in FIG. 2, after snapshot #1 was created, a write occurred on track #1 of the source volume. This caused the DIL image of snapshot #2 to include different metadata page C for tracks 0-4. Accordingly, when snapshot #2 is created, the differential process 160 will scan each of tracks 0-4 belong first metadata page and report the changed tracks.

The differential process 160 is also run on the target device as part of the link operation to determine which tracks of the target device have changed relative to the previous target image. For example, as shown in FIG. 2, after relinking snapshot #2 to target device, there was a write to track 7, and hence a new metadata page (page D) was allocated for tracks 5-9. When snapshot #3 is relinked to target device, the differential process 160 will compare image 2 of the target device (the previous image of the target device) and image 3 of the target device, which is based on snapshot image 3. The differential process 160 will skip the first metadata page (page C associated with tracks 0-4) since both images (image 2 and image 3) share the same metadata page. However, the differential process 160 will process tracks 5-9 because they point to different metadata pages. By determining which metadata pages of the DIL images have changed between subsequent snapshots, and between subsequent relink operations of a target device, it is possible to greatly reduce the amount of processing resources required to implement the differential process 160. Specifically, it is possible to cause the amount of processing resources of the differential process 160 to be proportional to the rate of change of data, for most cases, rather than being proportional to the size of the storage volume on which the snapshots are being created.

Figure 3:
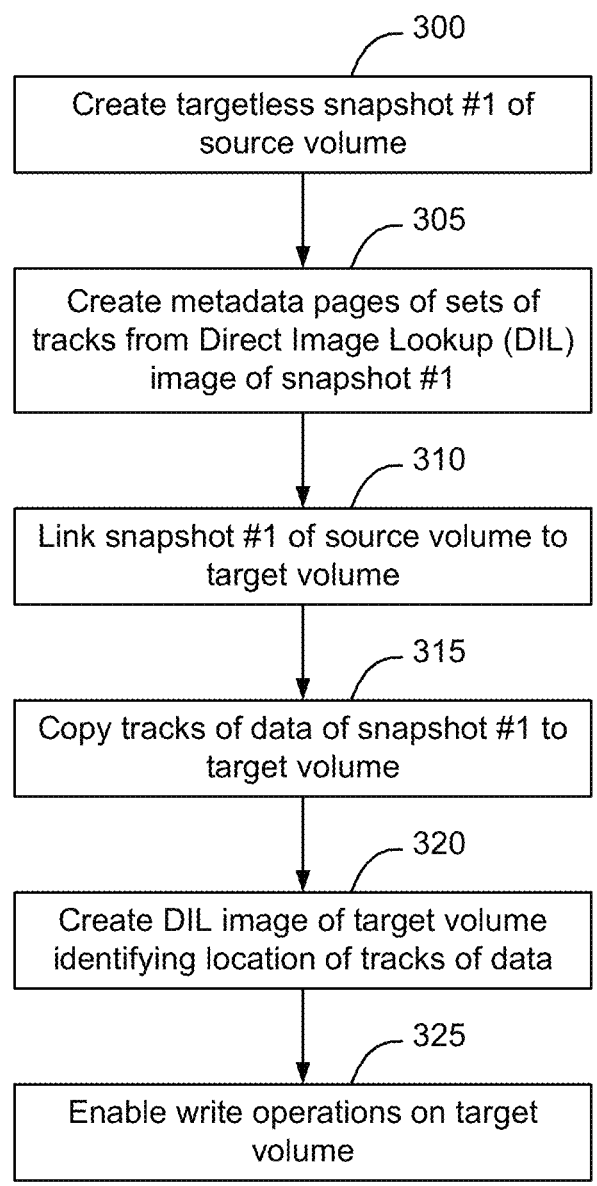
FIGS. 3-5 are flow charts of an example process of implementing quick differential determination between subsequent snapshot images and between a re-linked target device, according to some embodiments.

FIG. 3 is a flow chart of an example process of creating a snapshot of a source volume and linking the snapshot to a target device. As shown in FIG. 3, when a snapshot is created (block 300), the snapshot will include a DIL image identifying the location of all tracks of the storage volume at the particular point in time. According to some embodiments, metadata pages of sets of tracks are created from the DIL image (block 305).

If snapshot #1 of a source volume is linked to a target device (block 310), the tracks of the data of snapshot #1 will be copied to the target device (block 315) and a DIL image of the target device is created (block 320). Write operations may be enabled on the target device (block 325) depending on the implementation.

Figure 4:
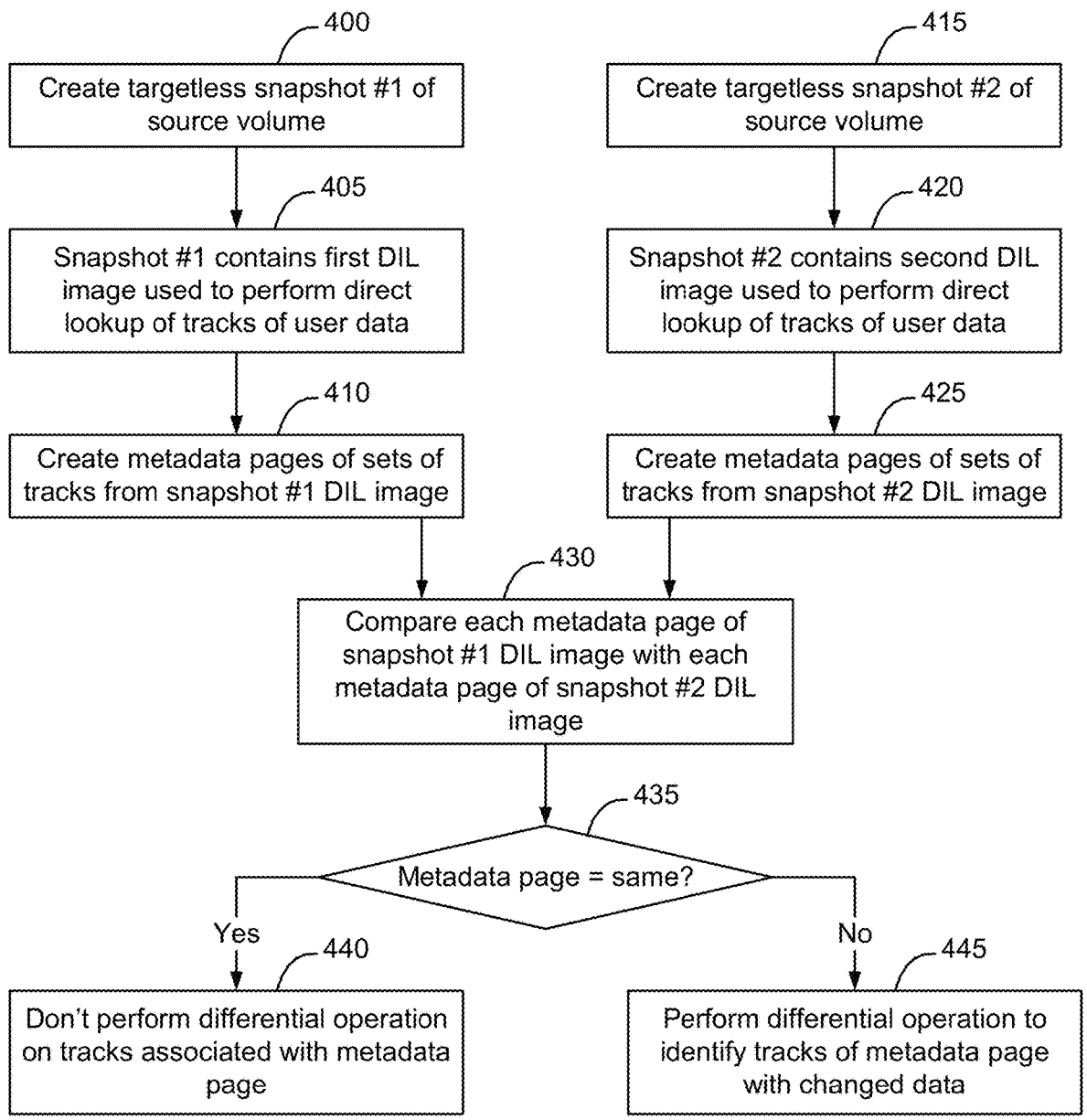

FIG. 4 is a flow chart of an example process of minimizing differential processing between subsequent snapshots of a storage volume. As shown in FIG. 4, in some embodiments when snapshot #1 is created (block 400) snapshot #1 will contain a first DIL image that is able to be used to perform direct image lookup of all tracks of user data of the source volume at the first point in time (block 405). A first set of metadata pages are created from this first DIL image, in which each metadata page represents a subset of the tracks of the source volume at the first point in time (block 410).

At a subsequent point in time, snapshot #2 is created (block 415). Snapshot #2 contains a second DIL image that is able to be used to perform direct image lookup of all tracks of user data of the source volume at the second point in time (block 420). A second set of metadata pages are created from this second DIL image, in which each metadata page represents a subset of the tracks of the source volume at the second point in time (block 425).

Differential subsystem 160 is used to implement a comparison (differential process) between each metadata page of snapshot #1 DIL image with each metadata page of snapshot #2 DIL image (block 430), and a determination is made as to whether the metadata page for a given set of tracks created from the first DIL image is the same as the metadata page for the corresponding set of tracks in the second DIL image (block 435). When the metadata pages for a given set of tracks created from the two DIL images are the same (a determination of YES at block 435) the differential subsystem 160 does not perform differential processing on the tracks associated with the metadata page. When the metadata pages for a given set of tracks created from the two DIL images are not the same (a determination of NO at block 435) the differential subsystem does perform differential processing on the tracks associated with the metadata page. The process of comparing metadata pages is implemented for each metadata page of the second DIL image, to enable the differential subsystem 160 to identify any tracks of data contained in the second snapshot that are different than tracks of data of the previous snapshot.

Figure 5:
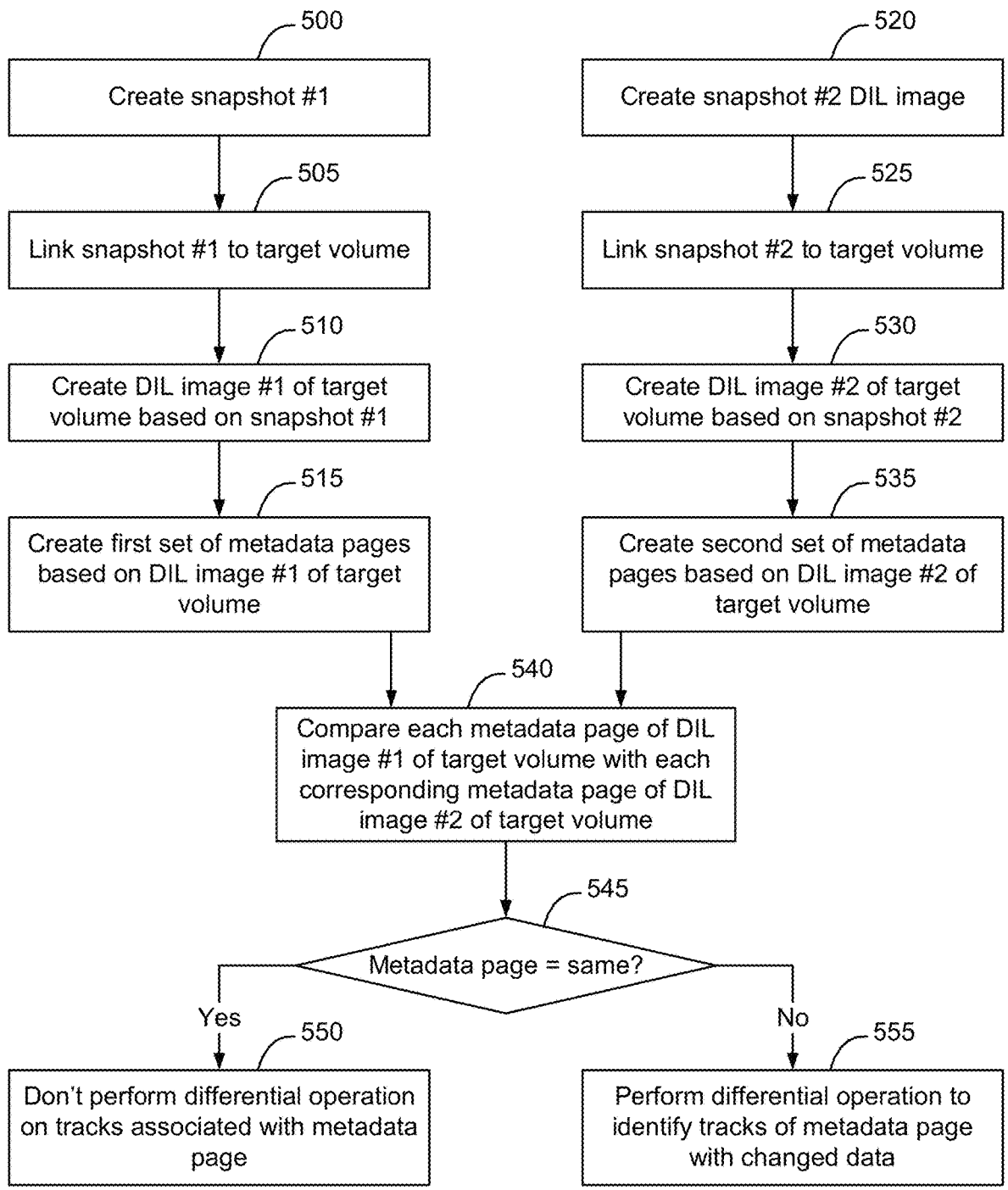

FIG. 5 is a flow chart of an example process of minimizing differential processing on a target device when a given target device is initially linked to a first snapshot of a storage volume, and then is re-linked to a subsequent snapshot of the storage volume. As shown in FIG. 5, in some embodiments when snapshot #1 is created (block 500) snapshot #1 is linked to the target device (block 505). In connection with linking the snapshot to the target device, a first DIL image of the data stored on the target device (DIL images #1) will be created (block 510). A first set of metadata pages are created from this first DIL image, in which each metadata page represents a subset of the tracks of the data contained in the target device at the first point in time. If write operations occur on the target device, the DIL image of the target device will change, and the metadata pages will change accordingly.

At a subsequent point in time, snapshot #2 is created (block 520). A relink operation causes the target device to be relinked to snapshot #2 (block 525). In connection with the relink operation, DIL image #2 of the data contained in the target device is created (block 530) and a second set of metadata pages are created from this second DIL image (block 535), in which each metadata page represents a subset of the tracks of the data of the target device at the second point in time.

A comparison is then made between each metadata page of the DIL image of the target device immediately prior to the relink operation, and each corresponding metadata page of the DIL image of the target device after the relink operation (block 540), and a determination is made as to whether the metadata page for a given set of tracks created from the first DIL image is the same as the metadata page for the corresponding set of tracks in the second DIL image (block 545). When the metadata pages for a given set of tracks created from the two DIL images are the same (a determination of YES at block 545) the differential subsystem does not perform differential processing on the tracks of the target device associated with the metadata page. When the metadata pages for a given set of tracks created from the two DIL images are not the same (a determination of NO at block 545) the differential subsystem 160 does perform differential processing on the tracks associated with the metadata page of the target device. The process of comparing metadata pages is implemented for each metadata page of the second DIL image, to enable the differential subsystem 160 to identify any tracks of data contained in the re-linked target device that are different than tracks of data that were previously contained by the target device.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated. The term "about" is used to indicate that a value includes the standard level of error for the device or method being employed to determine the value. The use of the term "or" in the claims is used to mean "and/or" unless explicitly indicated to refer to alternatives only or the alternatives are mutually exclusive, although the disclosure supports a definition that refers to only alternatives and to "and/or." The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for determining quick differentials for snapshots and linked targets, the computer program including a set of instructions which, when executed by a computer, cause the computer to perform a method comprising the steps of:
   determining a first set of metadata pages from a first Direct Image Lookup (DIL) image of a first version of a storage object, the first DIL image containing reference values that enable direct lookup of map tracks of the first version of the storage object to on backend storage locations where tracks of data of the corresponding tracks of the first version of the storage object are located on backend storage resources at a first point in time;
   determining a subsequent second set of metadata pages from a second DIL image of a second version of the storage object, the second DIL image containing reference values that enable direct lookup of tracks of the second version of the storage object on backend storage locations where data of the corresponding tracks of the second version of the storage object are located on backend storage resources at a subsequent second point in time;

comparing each respective metadata page of the first set of metadata pages with each corresponding respective metadata page of the second set of metadata pages to identify a subset of the metadata pages of the second set of metadata pages that contain at least some metadata that is different than the corresponding respective metadata page of the first set of metadata pages;

upon determining that there is a difference between one of the metadata pages of the first set of metadata pages and a corresponding one of the metadata pages of the second set of metadata pages, implementing a differential operation on each of the tracks of the corresponding one of the metadata pages of the second set of metadata pages to identify which backend tracks of the second version of the storage object referenced by the one of the metadata pages contain different data than the corresponding backend tracks of the first version of the storage object; and upon determining that there is no difference between one of the metadata pages of the first set of metadata pages and a corresponding one of the metadata pages of the second set of metadata pages, concluding that the backend tracks of the second version of the storage object contain the same data as the corresponding backend tracks of the first version of the storage object and not implementing a differential operation on any of the tracks of the corresponding one of the metadata pages of the second set of metadata pages;

wherein differences between the first version of the storage object and the second version of the storage object are not known prior to comparison of the respective metadata pages of the first set of metadata pages with the second set of metadata pages, and wherein the differential process is used to identify differences between the first version of the storage object and second version of the storage object.

2. The non-transitory tangible computer readable storage medium of claim 1, wherein the first version of the storge object is a first snapshot of a storage volume taken at the first point in time, and wherein the second version of the storage object is a subsequent second snapshot of the storage volume taken at the subsequent second point in time.

3. The non-transitory tangible computer readable storage medium of claim 2, wherein the first snapshot is a first copy of the storage volume as the storage volume existed at the first point in time, and wherein the subsequent second snapshot is a second copy of the storage volume as the storage volume existed at the subsequent second point in time, wherein no additional snapshots of the storage volume are created between the first snapshot and the subsequent second snapshot.

4. The non-transitory tangible computer readable storage medium of claim 1, wherein the first version of the storage object is a target device linked to a first snapshot of a storage volume taken at the first point in time, and wherein the second version of the storage object is the target device linked to a subsequent second snapshot of the storage volume taken at the subsequent second point in time.

5. The non-transitory tangible computer readable storage medium of claim 4, wherein the first snapshot is a first copy of the storage volume as the storage volume existed at the first point in time, and wherein the subsequent second snapshot is a second copy of the storage volume as the storage volume existed at the subsequent second point in time, wherein no additional snapshots of the storage volume are created between the first snapshot and the subsequent second snapshot.

6. The non-transitory tangible computer readable storage medium of claim 1, wherein the first DIL image of the first version of the storage object contains metadata to perform direct lookup of all tracks of the data of the first version of the storage object; and wherein the second DIL image of the second version of the storage object contains metadata to perform direct lookup of all tracks of the data of the second version of the storage object.

7. The non-transitory tangible computer readable storage medium of claim 6, wherein each metadata page of the first set of metadata pages is created from the metadata of the first DIL image and contains reference values to a subset of the tracks of data of the first version of the storage object; and wherein each metadata page of the second set of metadata pages is created from the metadata of the second DIL image and contains reference values to a subset of the tracks of data of the second version of the storage object.

8. The non-transitory tangible computer readable storage medium of claim 7, wherein upon determining that there is a difference between one of the metadata pages of the first set of metadata pages and a corresponding one of the metadata pages of the second set of metadata pages, implementing the differential operation comprises:

comparing each track of data of the first version of the storage object associated with the reference values of the one of the metadata pages of the first set of metadata pages with each track of data of the second version of the storage object associated with the reference values of the corresponding one of the metadata pages of the second set of metadata pages to identify which tracks in the second version of the storage object contain different data than the corresponding tracks of the first version of the storage object.

9. A method of determining quick differentials for snapshots and linked targets, comprising:

determining a first set of metadata pages from a first Direct Image Lookup (DIL) image of a first version of a storage object, the first DIL image containing reference values that enable direct lookup of tracks of the first version of the storage object on backend storage locations where data of the corresponding tracks of the first version of the storage object are located on backend storage resources at a first point in time;

determining a subsequent second set of metadata pages from a second DIL image of a second version of the storage object, the second DIL image containing reference values that enable direct lookup of tracks of the second version of the storage object on backend storage locations where data of the corresponding tracks of the second version of the storage object are located on backend storage resources at a subsequent second point in time;

comparing each respective metadata page of the first set of metadata pages with each corresponding respective metadata page of the second set of metadata pages to identify a subset of the metadata pages of the second set of metadata pages that contain at least some metadata that is different than the corresponding respective metadata page of the first set of metadata pages;

upon determining that there is a difference between one of the metadata pages of the first set of metadata pages and a corresponding one of the metadata pages of the second set of metadata pages, implementing a differential operation on each of the tracks of the corresponding one of the metadata pages of the second set of metadata pages to identify which backend tracks of the second version of the storage object referenced by the one of the metadata pages contain different data than the corresponding backend tracks of the first version of the storage object; and upon determining that there is no difference between one of the metadata pages of the first set of metadata pages and a corresponding one of the metadata pages of the second set of metadata pages, concluding that the backend tracks of the second version of the storage object contain the same data as the corresponding backend tracks of the first version of the storage object and not implementing a differential operation on any of the tracks of the corresponding one of the metadata pages of the second set of metadata pages;

wherein differences between the first version of the storage object and the second version of the storage object are not known prior to comparison of the respective metadata pages of the first set of metadata pages with the second set of metadata pages, and wherein the differential process is used to identify differences between the first version of the storage object and second version of the storage object.

10. The method of claim 9, wherein the first version of the storge object is a first snapshot of a storage volume taken at the first point in time, and wherein the second version of the storage object is a subsequent second snapshot of the storage volume taken at the subsequent second point in time.

11. The method of claim 10, wherein the first snapshot is a first copy of the storage volume as the storage volume existed at the first point in time, and wherein the subsequent second snapshot is a second copy of the storage volume as the storage volume existed at the subsequent second point in time, wherein no additional snapshots of the storage volume are created between the first snapshot and the subsequent second snapshot.

12. The method of claim 9, wherein the first version of the storage object is a target device linked to a first snapshot of a storage volume taken at the first point in time, and wherein the second version of the storage object is the target device linked to a subsequent second snapshot of the storage volume taken at the subsequent second point in time.

13. The method of claim 12, wherein the first snapshot is a first copy of the storage volume as the storage volume existed at the first point in time, and wherein the subsequent second snapshot is a second copy of the storage volume as the storage volume existed at the subsequent second point in time, wherein no additional snapshots of the storage volume are created between the first snapshot and the subsequent second snapshot.

14. The method of claim 9, wherein the first DIL image of the first version of the storage object contains metadata to perform direct lookup of all tracks of the data of the first version of the storage object; and wherein the second DIL image of the second version of the storage object contains metadata to perform direct lookup of all tracks of the data of the second version of the storage object.

15. The method of claim 14, wherein each metadata page of the first set of metadata pages is created from the metadata of the first DIL image and contains reference values to a subset of the tracks of data of the first version of the storage object; and wherein each metadata page of the second set of metadata pages is created from the metadata of the second DIL image and contains reference values to a subset of the tracks of data of the second version of the storage object.

16. The method of claim 15, wherein upon determining that there is a difference between one of the metadata pages of the first set of metadata pages and a corresponding one of the metadata pages of the second set of metadata pages, implementing the differential operation comprises:

comparing each track of data of the first version of the storage object associated with the reference values of the one of the metadata pages of the first set of metadata pages with each track of data of the second version of the storage object associated with the reference values of the corresponding one of the metadata pages of the second set of metadata pages to identify which tracks in the second version of the storage object contain different data than the corresponding tracks of the first version of the storage object.

17. A system for determining quick differentials for snapshots and linked targets, comprising:

one or more computers and one or more storage devices storing instructions that are operable, when executed by the one or more computers, to cause the one or more computers to perform operations comprising:

determining a first set of metadata pages from a first Direct Image Lookup (DIL) image of a first version of a storage object, the first DIL image containing reference values that enable direct lookup of tracks of the first version of the storage object on backend storage locations where data of the corresponding tracks of the first storage object are located on backend storage resources at a first point in time;

determining a subsequent second set of metadata pages from a second DIL image of a second version of the storage object, the second DIL image containing reference values that enable direct lookup of tracks of the second version of the storage object on backend storage locations where data of the corresponding tracks of the second version of the storage object are located on backend storage resources at a subsequent second point in time;

comparing each respective metadata page of the first set of metadata pages with each corresponding respective metadata page of the second set of metadata pages to identify a subset of the metadata pages of the second set of metadata pages that contain at least some metadata that is different than the corresponding respective metadata page of the first set of metadata pages;

upon determining that there is a difference between one of the metadata pages of the first set of metadata pages and a corresponding one of the metadata pages of the second set of metadata pages, implementing a differential operation on each of the tracks of the corresponding one of the metadata pages of the second set of metadata pages to identify which backend tracks of the second version of the storage object referenced by the one of the metadata pages contain different data than the corresponding backend tracks of the first version of the storage object; and upon determining that there is no difference between one of the metadata pages of the first set of metadata pages and a corresponding one of the metadata pages of the second set of metadata pages, concluding that the backend tracks of the second version of the storage object contain the same data as the corresponding backend tracks of the first version of the storage object and not implementing a differential operation on any of the tracks of the corresponding one of the metadata pages of the second set of metadata pages;

wherein differences between the first version of the storage object and the second version of the storage object are not known prior to comparison of the respective metadata pages of the first set of metadata pages with the second set of metadata pages, and wherein the differential process is used to identify differences between the first version of the storage object and second version of the storage object.

18. The system of claim 17:

wherein the first version of the storge object is a first snapshot of a storage volume taken at the first point in time, the first snapshot being a first copy of the storage volume as the storage volume existed at the first point in time; and wherein the second version of the storage object is a subsequent second snapshot of the storage volume taken at the subsequent second point in time, the second snapshot being a second copy of the storage volume as the storage volume existed at the subsequent second point in time;

wherein no additional snapshots of the storage volume are created between the first snapshot and the subsequent second snapshot.

19. The system of claim 17:

wherein the first version of the storage object is a target device linked to a first snapshot of a storage volume taken at the first point in time, the first snapshot being a first copy of the storage volume as the storage volume existed at the first point in time; and wherein the second version of the storage object is the target device linked to a subsequent second snapshot of the storage volume taken at the subsequent second point in time, the second snapshot being a second copy of the storage volume as the storage volume existed at the subsequent second point in time;

wherein no additional snapshots of the storage volume are created between the first snapshot and the subsequent second snapshot.

20. The system of claim 17, wherein the first DIL image of the first version of the storage object contains metadata to perform direct lookup of all tracks of the data of the first version of the storage object; and wherein the second DIL image of the second version of the storage object contains metadata to perform direct lookup of all tracks of the data of the second version of the storage object;

wherein each metadata page of the first set of metadata pages is created from the metadata of the first DIL image and contains reference values to a subset of the tracks of data of the first version of the storage object;

wherein each metadata page of the second set of metadata pages is created from the metadata of the second DIL image and contains reference values to a subset of the tracks of data of the second version of the storage object, and wherein upon determining that there is a difference between one of the metadata pages of the first set of metadata pages and a corresponding one of the metadata pages of the second set of metadata pages, implementing the differential operation comprises:

comparing each track of data of the first version of the storage object associated with the reference values of the one of the metadata pages of the first set of metadata pages with each track of data of the second version of the storage object associated with the reference values of the corresponding one of the metadata pages of the second set of metadata pages to identify which tracks in the second version of the storage object contain different data than the corresponding tracks of the first version of the storage object.

* * * * *